United States Patent [19]
Breuer et al.

[11] 3,854,045
[45] Dec. 10, 1974

[54] MEASURING THE DUST CONCENTRATION IN AIR

[75] Inventors: Hans Breuer, Essen; Josef Gebhart, Frankfurt; Klaus Robock, Essen, all of Germany

[73] Assignee: Bergwerksverband GmbH, Essen, Germany

[22] Filed: Jan. 31, 1973

[21] Appl. No.: 328,347

Related U.S. Application Data
[63] Continuation-in-part of Ser. No. 190,944, Oct. 20, 1971.

[30] Foreign Application Priority Data
Oct. 21, 1970 Germany............................ 2051546

[52] U.S. Cl............................... 250/341, 250/343
[51] Int. Cl............................................. G01t 1/16
[58] Field of Search .......... 250/338, 343, 345, 353, 250/218, 220 SD, 574, 341; 356/103, 102

[56] References Cited
UNITED STATES PATENTS
2,076,553  4/1937  Drinker et al. ............... 250/220 SD
3,317,730  5/1967  Hilsum............................... 250/338

*Primary Examiner*—James W. Lawrence
*Assistant Examiner*—Davis L. Willis
*Attorney, Agent, or Firm*—Michael S. Striker

[57]  ABSTRACT

A light beam having a wavelength between 800 nm and 2,000 nm shines into a chamber having dust-containing air. Light dispersed by the dust at an angle between 60° and 80° to the beam direction is guided to photoelectric means where its intensity is measured. Preferably, the beam of light is modulated at a particular frequency and, following reception by a photosensitive element, a phase sensitive detector is employed to filter the desired light component from any interfering light components. The output signal of the phase sensitive detector, after amplification constitutes a measure of the dust concentration in the air.

20 Claims, 4 Drawing Figures

MEASURING THE DUST CONCENTRATION IN AIR

CROSS REFERENCE TO RELATED APPLICATIONS:

This application is a continuation-in-part of our application Ser. No. 190,944, filed Oct. 20, 1971 for METHOD AND APPARATUS FOR MEASURING THE DUST CONCENTRATION IN AIR, now abandoned.

BACKGROUND OF THE INVENTION

The present invention relates to apparatus of the type in which the concentration of dust in the atmospheric air is determined by measuring the intensity of light dispersed by the dust particles. The permissible dust concentration is photometrically evaluated in relation to the dust concentration permissible for inhaled air. The measuring indication of the apparatus must conform to the probability of retention of dust particles in the alveoli of the lungs, which is a function of the size of the dust particles.

For measuring dust concentrations, the Tyndalloscope is used, which is described in Glueckauf 90 (1954), page 455, and Glueckauf 91 (1955), page 1,405. This instrument uses white primary light and an angle of dispersion of 30°, and obtains measured values in which the influence of fine dust particles under 1.5 $\mu$ is substantially overrated, and does not conform to the probability of retention of the dust in the alveoli of the lungs as a function of the particle size.

Further, recent biological research has shown that the effect of the dust is not to be measured so much by the retention in the alveoli, but by the deposition of fine dust particles therein. The deposition curve which is also a function of the size of the dust particles has a maximum which coincides with larger diameter dust particles. The exact shape of the deposition curve is not yet known. However, in order to get the most meaningful photometric measurement of the percentage of dust particles, a possibility must exist that the resulting cuve is adjusted to be as much as possible in agreement with the curve for the probability of the deposit of dust particles in the alveoli of the lung.

According to the prior art, it was assumed that the amount of light dispersed by fine dust particles, depended, in addition to the size and distribution of the dust particles, also on the properties of the substances and materials forming the dust particles, while the selection of the wavelength of the primary light and of the dispersion angles was considered as immaterial. In contrast, the present invention is based on the surprising recognition that the intensity of light dispersed by fine dust particles, for example coal particles, is substantially independent of properties of the material, and that it is possible to vary the functional dependency on the size of the dust particles by variations of the angle of dispersion and of the wavelength range of the primary light.

SUMMARY OF THE INVENTION:

It is one object of the invention to overcome the disadvantage of the prior art, and to provide a method and apparatus for obtaining a measured value of the concentration of fine dust in the air, almost completely conforming to the probability of curve of dust retention and having the capability for taking into consideration the curve of the probability of dust deposition in the alveoli of the lungs.

Another object of the invention is to obtain an accurate measurement of the concentration of fine dust in air by using a different angle of dispersion and wavelength of primary light as compared with the prior art so that the measured value corresponds to the retention and deposition probability of fine dust in the lungs.

With these objects in view, only a portion of the dispersed light, defining an angle of dispersion between 60° and 80°, preferably 70°, is guided through optical means such as lenses and prisms to a measuring instrument.

In order to obtain objective measured data without the subjective visual photometric balancing of the light intensity, and also for measuring the nearly infrared range of wavelengths between 800 nm and 2,000 nm, a photoelectric system for measuring the light intensity is used.

A method of the present invention comprises illuminating dust-containing air with a first beam of light having a wavelength between 800 nm and 2,000 nm. The dust in the dust-containing air disperses the light, and the method of the present invention further comprises the step of separating the light dispersed by the dust particles at an angle between 60° and 80° to the direction of said first beam. The light intensity of the so-dispersed light is then measured, the so-measured light intensity constituting a measure of the dust concentration in the air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing:

DESCRIPTION OF THE PREFERRED EMBODIMENTS

Figure 1:
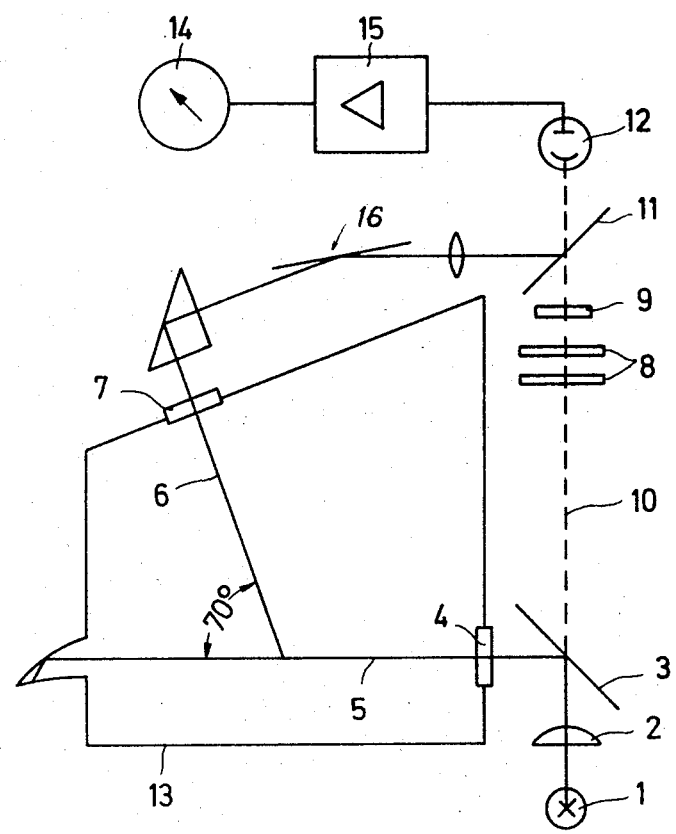
FIG. 1 is a schematic and diagrammatic view illustrating an apparatus according to one embodiment of the invention.

Referring first to FIG. 1, an infrared source of light 1 projects infrared light having a wavelength between 800 nm and 2,000 nm through a condenser 2 onto a semitransparent mirror 3 which splits the primary light into a first beam 5 and a second beam 10. Due to the position of mirror 3, the first and second beams 5, 10 are perpendicular to each other. A measuring chamber has a first wall perpendicular to the direction of beam 5, and is provided with a window 4 through which beam 5 enters the measuring chamber 13 which contains air whose dust concentration is to be measured. The illuminated dust particles disperse and scatter the light of beam 5, but only dispersed light having an angle of dispersion between 60° and 80°, shown to be 70° can leave the closed measuring chamber 13 since the window 7 is provided in a wall which defines an angle of 70° with the first wall of the measuring chamber and as schematically indicated at 16, only the light dispersed at an angle of substantially 70° passes through a prism and a lens and impinges a semitransparent mirror 11 so that dispersed light of the first beam 5 and primary light of the second beam 10 together enter a photoelectric means 12. This may be either one photoreceiver alternately impinged by the dispersed measuring light of beam 5 and by the primary light of beam 10, or it may consist of two photoreceivers with a compensation circuit, the dispersed measuring light and the primary light being simultaneously received by the two photoreceivers.

The above described photoelectric means are known to those skilled in the art and not an object of the invention but permit an objective evaluation of the light intensities of the primary and measuring light, without subjective balancing of the light intensities.

The reference light of the beam 10 passes through two polarizing filters so that its intensity can be varied and attenuated by turning the manually operated analysator member 9. The required variation of the intensity of the reference light beam 10, given by the angular position of the manually operated member 9, is a measure for the intensity of the dispersed light when measuring and reference light balance each other in the photoelectric means 12. The indication of the same intensity of dispersed measuring light and primary reference light 10 is indicated by the pointer of an instrument 14 which is connected by an amplifier 15 with the photoreceiver means 12, and assumes the position zero when the intensities of the dispersed measuring light and of the primary reference light of beam 10 are equal.

Figure 2:
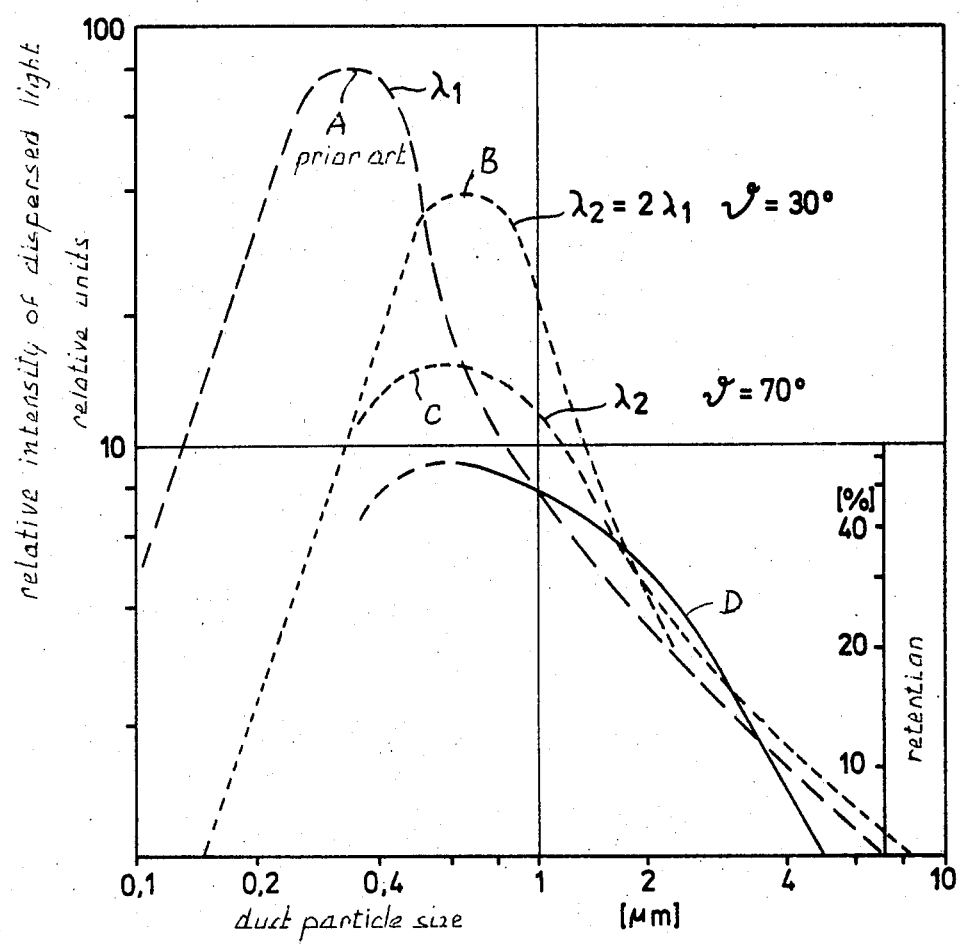
FIG. 2 is a diagram graphically illustrating the amount of dispersed air obtained at different dispersion angles and with different wavelengths for dust particles of different size.

The diagram of FIG. 2 shows three graphs A, B and C, of which graph A refers to the prior art and graphs B and C partly and completely refer to the present invention. Graphs A, B and C illustrate the relative intensity of the dispersed light in relative units depending on the dust particle size. Graph D illustrates the probable retention of dust particles in the lungs, measured in percents, as shown by the scale on the right of FIG. 2.

Graph A illustrates the light intensity of dispersed light having a wavelength $\lambda_1$ which in accordance with the prior art, is between 350 nm and 550 nm, and dispersed at an angle $\zeta$ which is 30°.

Graph B shows the relative light intensity of dispersed light for the same angle of dispersion $\zeta$ of 30°, but a wavelength $\lambda_2$ which is equal to 2 $\lambda_1$.

The graph C shows the relative intensity of the dispersed light for a wavelength of $\lambda_2$, between 700 nm and 1,100 nm, but for angle of dispersion of 70°. It is evident that graph C, indicating the condition in accordance with the present invention, conforms in shape to graph D which indicates the probability of retention of the dust particles in the alveoli of the lungs in percents so that the apparatus and method of the invention obtain a corresponding evaluation of the dust concentration in the air, which is not possible in accordance with the prior art as represented by graph A, or even by graph B in which the infrared wavelength in accordance with the present invention is used for the primary light.

Figure 3:
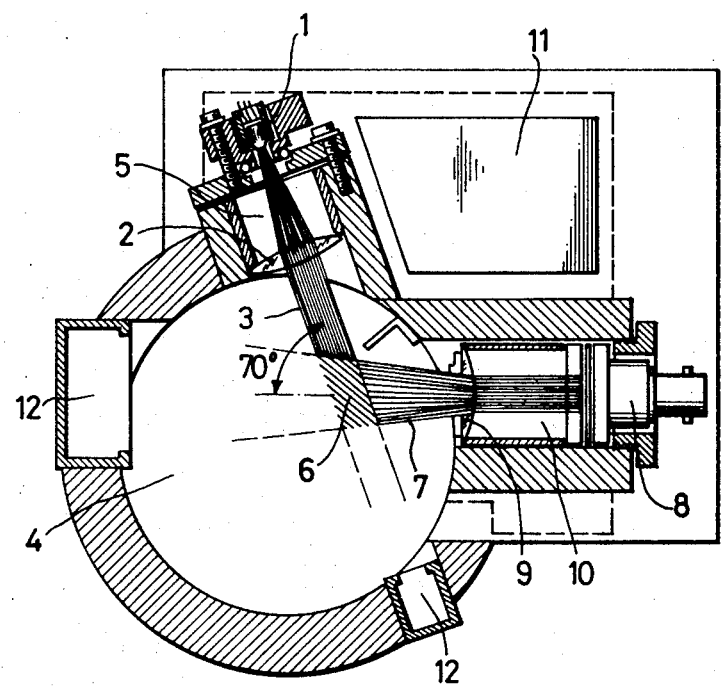
FIG. 3 is a diagrammatic view illustrating an alternate embodiment of a measuring chamber and light source.

A second embodiment of the measuring chamber is shown in FIG. 3. It will be noted that the chamber in FIG. 3 is tubular in character; in other words it is for example a section of a pipe. A source of illumination 1, which may be for example a gas luminescent diode, emits light which is gathered into a parallel bundle by a lens 2. A so-formed light bundle constitutes the primary light 3 which passes into the measuring chamber 4 which is open in the direction perpendicular to the plane of the Figure. The light is admitted to the chamber through an opening 5 and falls onto the fine dust particles which are within the chamber. A photoelectric receiving element which, in a preferred embodiment, is a silicon photodiode is positioned at an angle between 60° and 80°, preferably 70°, relative to the direction of propagation of the primary light 3. The light impinging upon photoelement 8 is thus that portion of the light dispersed by the dust which is at the angle between 60° to 80° (70°), relative to the primary light beam, if light passes through the exit opening or window 10 of measuring chamber 4 prior to reaching the photoelectric element 8. It should be noted that throughout this application the term "opening" and the term "window" is used interchangeably. The photoelectric element has a maximum sensitivity at the wavelength of the light emitted by the light source. Only a very low supply voltage as, for example, 3.7 volts, is required for both the light source and the receiver and the battery supply can thus be a small battery placed within the measuring unit. The electrical circuitry used to evaluate the light impinging on the photocell as well as the battery furnishing the current are housed in the portion of the unit designated by reference numeral 11.

Light absorption means, such as a light trap 12, are mounted on the walls, so that light which would otherwise be deflected from the walls and might hit the photosensitive element is absorbed.

Figure 4:
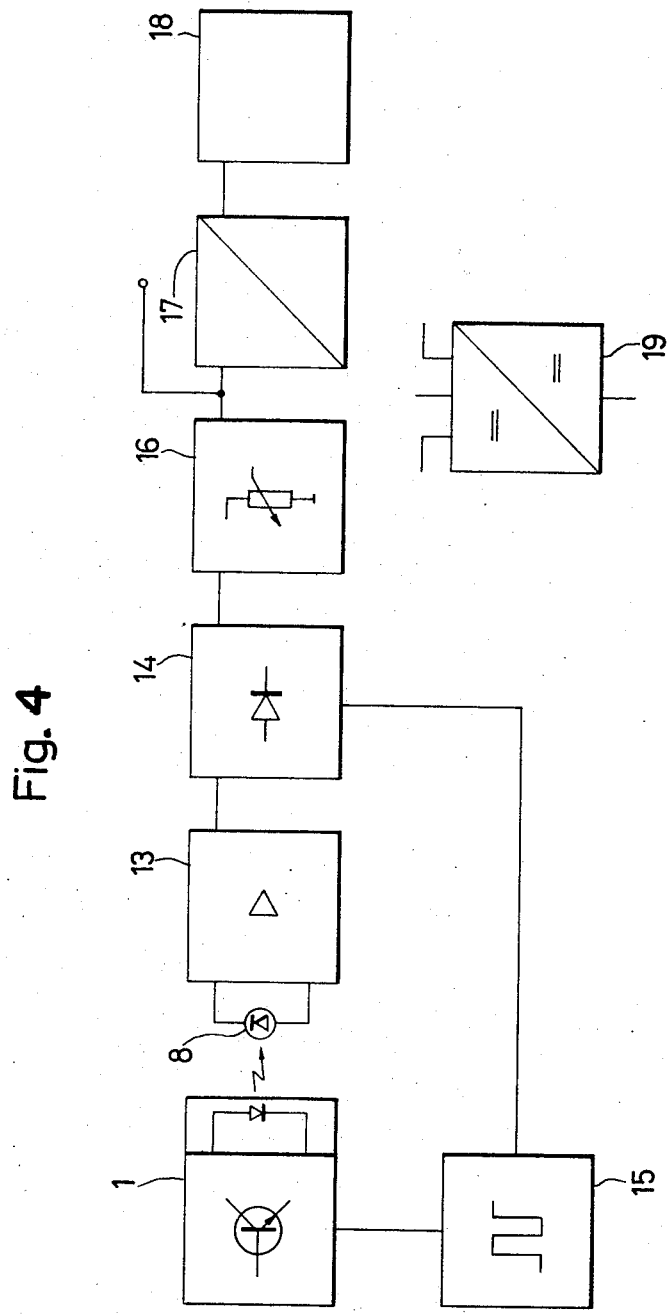
FIG. 4 is a schematic diagram of an alternate embodiment of a photoelectric measuring circuit.

FIG. 4 shows the electrical arrangement associated with the measuring chamber and light source of FIG. 3. The circuitry of FIG. 4 could of course be used in association with any suitable measuring chamber. It is simply required that the light falling on photoelement 8, which is also shown in FIG. 4, be the correct portion of the dust-dispersed light. Thus FIG. 4 shows a gas luminescent diode 1, which emits light a portion of which falls upon the photoelement 8. The resulting electrical signal is amplified by a preamplifier 13. The output of preamplifier 13 is applied to the input of a phase sensitive rectifier 14 which is controlled by an oscillator 15. Oscillator 15 also modulates light source 1 and has a frequency of, for example, 1kHz. The output of phasesensitive rectifier 14 is thus a signal which varies only as a function of the correctly modulated light falling upon photosensitive element 8. Any stray light which may fall on element 8 would not be modulated at the correct frequency and would, therefore, be suppressed by the rectifier or detector 14. An open measuring chamber can thus be used since any stray light falling in such a chamber would not affect the measuring results. A second amplifier 16 is used to amplify the output of the phase-sensitive rectifier 14. As indicated by the variable resistor at the output of amplifier 16, the gain of this amplifier is continually variable. This amplifier is used to adjust the gain of the system for calibration purposes after known interruptions in the measuring process. Under these conditions a standard arrangement 1 is used at the input and the system is calibrated before new measurements are carried out. Thus both the zero point and the remaining calibration can be undertaken. The measuring signal which appears at the output of amplifier 16, and which constitutes a measure of the dust concentration in the air, may be applied to a recorder for continuous registration or, alternatively, may be applied to an analog-digital converter 17 for indication on a digital type indicator using light emitting diodes 18. A battery 19 is used to supply the power to the various elements and has been mentioned above.

While the invention has been illustrated and described as embodied in a method and apparatus for measuring and indicating dust concentrations in accordance with the probability of dust retention and deposition in the lungs, it is not intended to be limited to the details show, since various modifications, circuit and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method for measuring the dust concentration in dust-containing air, comprising, in combination, the steps of illuminating said dust-containing air with a beam of light having a wavelength between 800 nm and 2,000 nm and travelling in a predetermined direction; detecting light which is forwardly scattered by the dust particles at an angle between 60° and 80° to said predetermined direction; and measuring the intensity of the so-scattered light, said so-measured intensity constituting a measure of said dust concentration of dust having a grain size within a predetermined continuous range in said air.

2. Method as set forth in claim 1, wherein step of illuminating said dust-containing air with a light beam comprises generating a primary light beam; dividing said primary light beam into a first beam and a second beam; and illuminating said dust-containing air with said first beam only.

3. Method as set forth in claim 2, wherein measuring the light intensity of said so-received light comprises comparing the light intensity of said so-received light with the intensity of said second beam.

4. Method as set forth in claim 3, wherein the step of comparing the intensity of said so-received light with the intensity of said second beam comprises attenuating the light of said second beam until the intensity thereof is equal to the intensity of said so-received light, whereby the degree of required attenuation is a measure of said dust concentration in said air.

5. Method as set forth in claim 1, wherein said angle is an angle of 70°.

6. Apparatus for measuring the dust concentration of dust-containing air, comprising, in combination, means for furnishing a first beam of light having a wavelength between 800 nm and 2,000 nm; and at least partially enclosed chambers filled with said dust-containing air and having a first window for entry of said first beam into said chamber so that the dust particles in said chamber disperse the light of said first beam, and having a second window disposed to permit passage of light dispersed by said dust particles at an angle between 60° and 80° to the direction of said first beam; photoelectric means for furnishing a light intensity signal corresponding to the intensity of light falling thereon; and first optical means for guiding light dispersed at an angle between 60° and 80° to the direction of said first beam and passing through said second window to said photoelectric means, whereby said light intensity signal constitutes a measure of the dust concentrations of said dust-containing air.

7. Apparatus as set forth in claim 6, wherein said means for furnishing a first beam of light comprise a source of primary light having a wavelength between 800 nm and 2,000 nm, and optical splitting means for splitting said primary light into a first and second beam; further comprising second optical means for guiding said second beam to said photoelectric means; and wherein said photoelectric means comprise comparing means for comparing the light intensity of said dispersed light with the light intensity of said second beam.

8. Apparatus as claimed in claim 7 wherein said photoelectric means includes a light responsive receiver, and means for alternately impinging onto said receiver light of said second beam and said dispersed light passing through said second window.

9. Apparatus as claimed in claim 7 wherein said photoelectric means includes first and second light responsive receivers receiving dispersed light passing through said second window and light of said second beam, respectively.

10. Apparatus as claimed in claim 7 wherein said second optical means include two polarizing filters, and manually turnable means operating said filters for varying the intensity of the light of said second beam.

11. Apparatus as claimed in claim 7 wherein said chamber has a first wall perpendicular to said first beam and having said first window, and a second wall extending at an angle of substantially 70° to said first wall and having said second window.

12. Apparatus as claimed in claim 11, wherein said splitting means include a semitransparent mirror positioned so that said first and second beams are perpendicular to each other.

13. Apparatus as set forth in claim 6, wherein said photoelectric means comprise a silicon photodiode.

14. An arrangement as set forth in claim 6, wherein said chamber is a tubular chamber, open on two sides in the axial direction.

15. Apparatus as set forth in claim 14, further comprising light traps arranged in said chamber for preventing light deflected from the walls of said chamber from inpinging on said photoelectric means.

16. Apparatus as set forth in claim 6, further comprising modulating means for modulating said first light beam with a signal having a predetermined frequency, thereby creating a modulated light beam; wherein said photoelectric means comprise a photoelectric element for receiving said modulated light beam and furnishing a corresponding electrical signal; phase sensitive rectifier means connected to said photoelectric element for furnishing a rectifier output signal corresponding to said electrical signal; and indicator means for furnishing a visual indication of said rectifier output signal.

17. Apparatus as set forth in claim 16, wherein said indicator means comprise recorder means.

18. Arrangement as set forth in claim 16, further comprising analog-digital converter means connected between said indicator means and said phase sensitive rectifier means; and wherein said indicator means comprise light emitting diode means.

19. Apparatus as set forth in claim 16, further comprising calibrating means connected to the output of said phase sensitive rectifier means.

20. Apparatus as set forth in claim 19, wherein said calibrating means comprise amplifier means having an adjustable gain.

* * * * *